United States Patent [19]

Herman

[11] Patent Number: 4,969,203
[45] Date of Patent: Nov. 6, 1990

[54] MULTIPLICATIVE SIEVE SIGNAL PROCESSING

[75] Inventor: Stephen Herman, Monsey, N.Y.

[73] Assignee: North American Philips Corporation, New York, N.Y.

[21] Appl. No.: 147,845

[22] Filed: Jan. 25, 1988

[51] Int. Cl.$^5$ .............................................. G06K 9/40
[52] U.S. Cl. ........................................ 383/54; 382/33; 364/724.01; 364/724.1; 364/825
[58] Field of Search ..................... 382/31, 32, 33, 54; 364/825, 724.01, 724.1

[56] References Cited

U.S. PATENT DOCUMENTS

| | | | |
|---|---|---|---|
| 4,082,431 | 4/1978 | Ward | 382/31 |
| 4,282,510 | 8/1981 | Southgate | 382/31 |
| 4,330,775 | 5/1982 | Iwamoto et al. | 382/31 |
| 4,665,551 | 5/1987 | Sternberg et al. | 382/54 |
| 4,672,463 | 6/1987 | Tomohisa et al. | 382/54 |
| 4,736,448 | 4/1988 | Umemura | 382/54 |
| 4,809,348 | 2/1989 | Meyer et al. | 382/54 |

OTHER PUBLICATIONS

Okada, T. et al., "New Filter Technology in Picture Processing", *IEEE Trans. on Cons. Elec.*, vol. CE-28, No. 3, Aug. 1982.

*Primary Examiner*—David K. Moore
*Assistant Examiner*—Jose L. Couso
*Attorney, Agent, or Firm*—Jack E. Haken

[57] ABSTRACT

A masked monopolar sifting filter implemented by multiplying an input signal by a series of shifted nonuniform mask signals and selecting the minimum signal sample value from each resultant product. The intermediate signal thus produced is then again multiplied by the shifted mask signals and the maximum signal sample value from each product chosen to produce a filtered output signal. The filters are particularly useful for edge enhancing features of selected sizes in an image signal.

21 Claims, 4 Drawing Sheets

FIG.6a    FIG.6b    FIG.7a    FIG.7b
 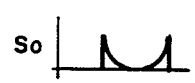  
FIG.8
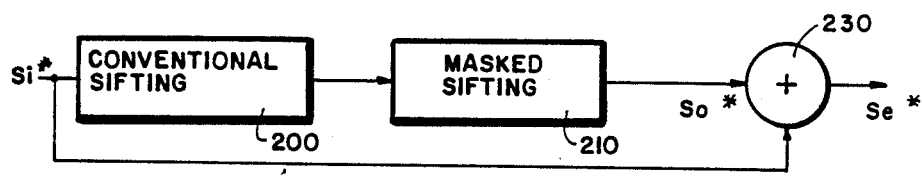
FIG.9a    FIG.9b    FIG.9c
 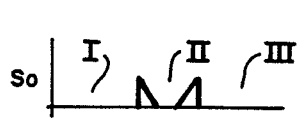 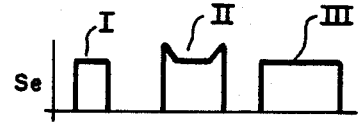
FIG.10a    FIG.10b
 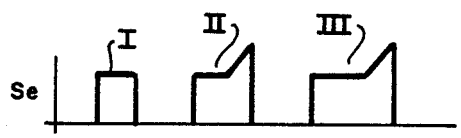

MULTIPLICATIVE SIEVE SIGNAL PROCESSING

The invention relates methods and circuits for signal processing. More particularly, the invention relates to methods and circuits for implementing multiplicative sieve filtering. The invention is directly applicable to edge-enhancement and noise reduction to in two-dimensional image signals.

DESCRIPTION OF THE PRIOR ART

Morphological filters are nonlinear signal transformations that operate on a picture directly in the space domain. Such filters are based on the theory of mathematical morphology as formulated by Matheron and Serra. *Greyscale Morphology* by Stanley Sternberg, Computer Vision, Graphics and Image Processing, 35, 333-355 (1986) generalized such earlier results to include graytone images. Sternberg also introduced the "rolling ball" morphological operator and pointed out that it can be used for edge enhancement.

A sieve is a signal processing algorithm which is based on a variation of the rolling ball algorithm. It has a parameter called hole size. When a one-dimensional signal is processed with a sieve algorithm, all signal peaks which are shorter in duration than the hole size are clipped or sifted by the sieve. Sieves which operate on both positive and negative going signal peaks are called bipolar sieves. Those that operate only on either positive going peaks or on negative going peaks are called monopolar sieves.

It is known that monopolar sieves may be used to construct high pass, low pass, bandpass and bandstop sieves.

Implementation of the monopolar sieve can be based on the definition of the "logical filter" (*New Filter Technology in Picture Processing,* Okada et al., IEEE Transactions on Consumer Electronics, Vol. CE-28, No. 3, August 1983). The authors describe the construction of bipolar sieves from monopolar sieve modules.

The duration of a time sampled signal component is its siftency which is measured in number of samples. A monopolar sieve is a time or spatial domain high pass sieve in that signal siftency components which are smaller than the filter hole size are eliminated.

If the output of a monopolar sieve is subtracted from its input the result is a low pass sieve. If the output of the sieve having a cut off A is subtracted from the output of a sieve having a cut off B (A<B) then the result is a bandpass sieve having its bandpass from A to B. If the output of a bandpass sieve is subtracted from its input the result is a bandstop sieve.

FIG. 1 illustrates a conventional positive monopolar sieve algorithm of the prior art (also known as "morphological opening") which operates on a sampled input signal $S_i^*$ to produce an output signal $S_o^*$. A mask signal M which defines a window which is L samples wide (L being odd) is sequentially shifted over samples of input signal $S_i^*$. An intermediate signal $S_m^*$ is produced by generating a new intermediate signal sample value at each position of the shifted mask. The new intermediate signal sample value, which is located at the center of the mask window, is generated by choosing the minimum of all signal samples covered by the window during the relevant shifted position. The mask window is then shifted by one pixel or sample and the process is repeated to generate another intermediate signal sample.

The mask signal is then shifted over the intermediate signal $S_m^*$ to generate output signal samples. At each position of the mask with respect to the intermediate signal, an output signal sample is generated at a position which corresponds to the center of the mask window. Each output signal sample is generated by choosing the maximum value of all of the intermediate signal values which fall within the mask window. The mask window is then shifted by one pixel and a new output signal sample is generated by again choosing the maximum value of the covered intermediate signal sample values.

The algorithm described above with respect to FIG. 1 implements a positive monopolar sieve. If the window is L samples wide, the hole size of the sieve is L-1. All positive going features of the input signal which are smaller than L-1 will be eliminated.

If the operations described above are reversed, that is if the first mask shifting operation chooses maximum sample values from the input signal and the second mask shifting operation chooses minimum values from the intermediate signal, the algorithm is a negative monopolar sieve which clips negative going features which are smaller than the hole size.

The above-described algorithms are also known in the existing literature as min-max filters or erosion-dilation filters or openings and closings.

SUMMARY OF THE INVENTION

The invention improves on known monopolar sieve algorithms and is particularly useful for the construction of edge-enhancement filters. The selection mask window of prior art sieves is replaced by a multiplicative mask having a non-uniform shape and the operation is modified so that the signal samples are multiplied by corresponding mask values before the minimum and/or maximum value is chosen. The filtering process is hereinafter referred to as mask sifting.

Mask sifting filters can be combined with conventional sifting filters to produce a large variety of edge-enhancement effects. The resultant sifting filters are particularly useful for enhancing edges of objects in images, such as medical diagnostic images, since they allow control of the size of the objects whose edges are to be enhanced. For example the edges of all objects which are larger than a predetermined dimension D are enhanced while smaller objects, as well as noise away from the object, are unaffected by the enhancement operation. Alternately, objects which are smaller than a preselected dimension D may have their edges enhanced or objects having a dimension which lies between two preselected limits may have their edges enhanced while other objects in the image remain unaffected. Further, by choosing the mask shape, the size and profile of the edge-enhancement function may be adjusted.

DESCRIPTION OF THE DRAWINGS

The invention may be understood by reference to the drawings in which:

FIGS. 6a and 6b together with FIGS. 7a and 7b illustrate the effect of mask shape on an edge-enhancement function;

FIG. 8 is a bandpass edge-enhancement circuit;

FIGS. 9a through 9c illustrate the operation of the circuit of FIG. 8; and

FIGS. 10a and 10b illustrate the use of a nonsymmetrical mask to produce edge-enhancement with shadow characteristics.

DESCRIPTION OF THE PREFERRED EMBODIMENTS

Figure 3A:
FIGS. 3a through 3c are waveforms which illustrate the masked positive monopolar sifting filter operation.
Figure 2A:
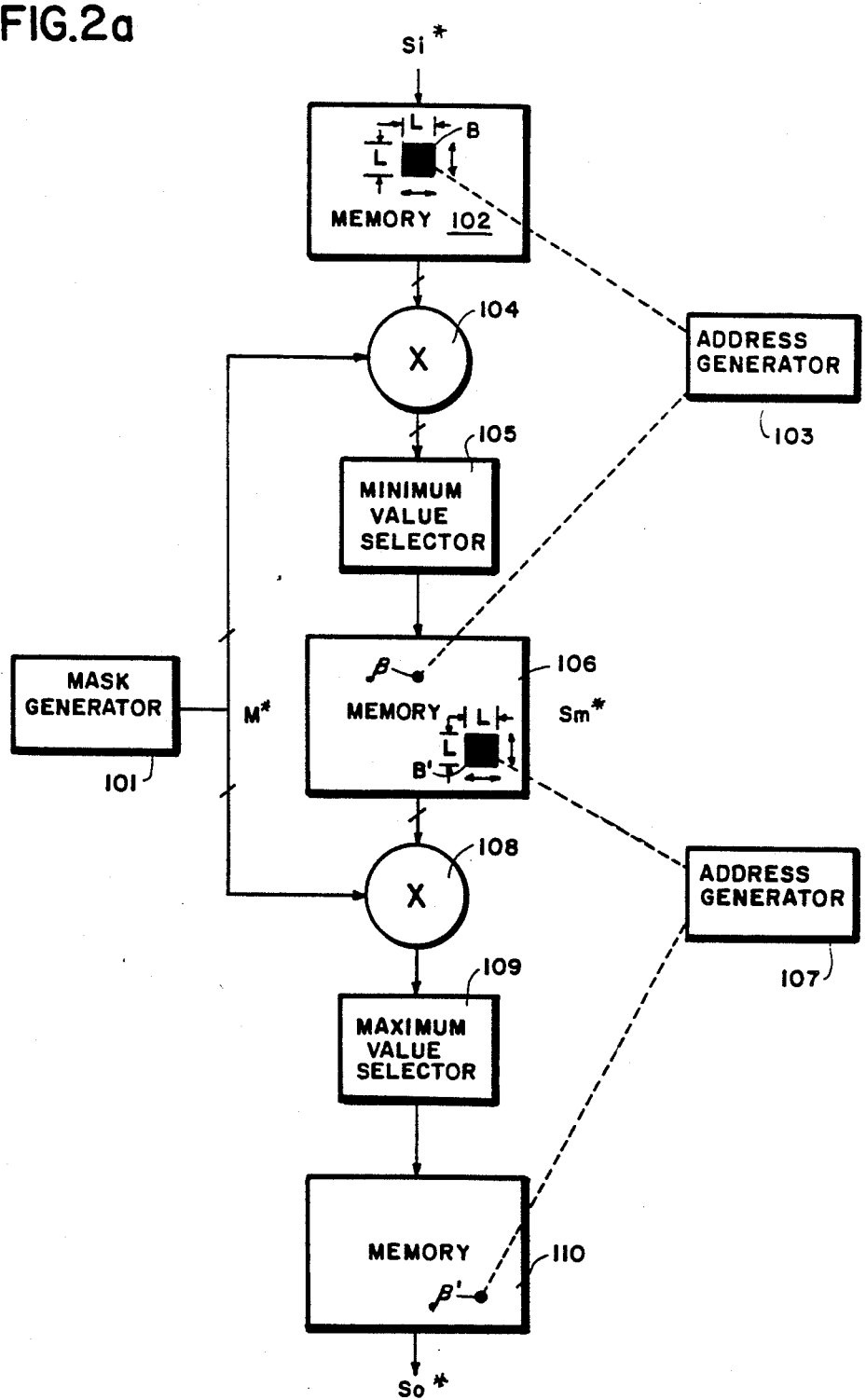
FIG. 2a illustrates a circuit which implements a masked positive monopolar sifting filter.

FIG. 2a is a circuit which implements a masked positive monopolar sifting operation on a two-dimensional signal $S_i^*$ which may, for example, be a two-dimensional medical image signal. A mask generator circuit 101 generates a two-dimensional mask signal which has zero value except at a predetermined number of signal sample points which lie within and define a square mask window with a hole size L by L signal sample points (L is an odd integer larger than 1). The mask signal sample values within the window should not be uniform and may, for example, have a one dimensional profile cross section as illustrated in FIG. 3a.

The input signal $S_i^*$ sample values are stored in a first memory 102. The memory 102 is addressed by mask shifter address generator circuit 103 which sequentially causes the memory 102 to output blocks B of L by L contiguous input signal sample values to the input of a point by point multiplier circuit 104. The multiplier 104 multiplies each signal sample value in the block from memory 102 by the corresponding signal sample value in the mask. The output of the multiplier is an L by L block of product values 104 is applied to a minimum value selector circuit 105 which selects the smallest value from each set of the L by L mask and block product values. The address generator 103 addresses the input of a second memory 106 so that the minimum value selected by the minimum value selector circuit 105 is stored into a memory location A which corresponds to the center of in the block B of signal samples selected from memory 102. The address generator 103 sequentially moves the location of block B in memory 102 to cover all possible memory locations, for example in a raster scan pattern, to fill the second memory 106 with an intermediate signal $S_m^*$ having sample values which correspond to the minimum value in each block-mask product.

A second mask shifter address generator circuit 107 then addresses the output of memory 106 to sequentially produce sample blocks B' which are multiplied by the mask signal in a second point-by-point multiplier 108. A maximum value selector circuit 109 selects the maximum produce value at each possible location of the block B' and writes that value into a corresponding location B' in a third memory 110. When the block B' has been shifted over all possible locations in memory 106 the signal stored in memory 110 is the output signal $S_o^*$ which is a masked positive monopolar sieve filtering of the input signal $S_i^*$.

Figure 2B:
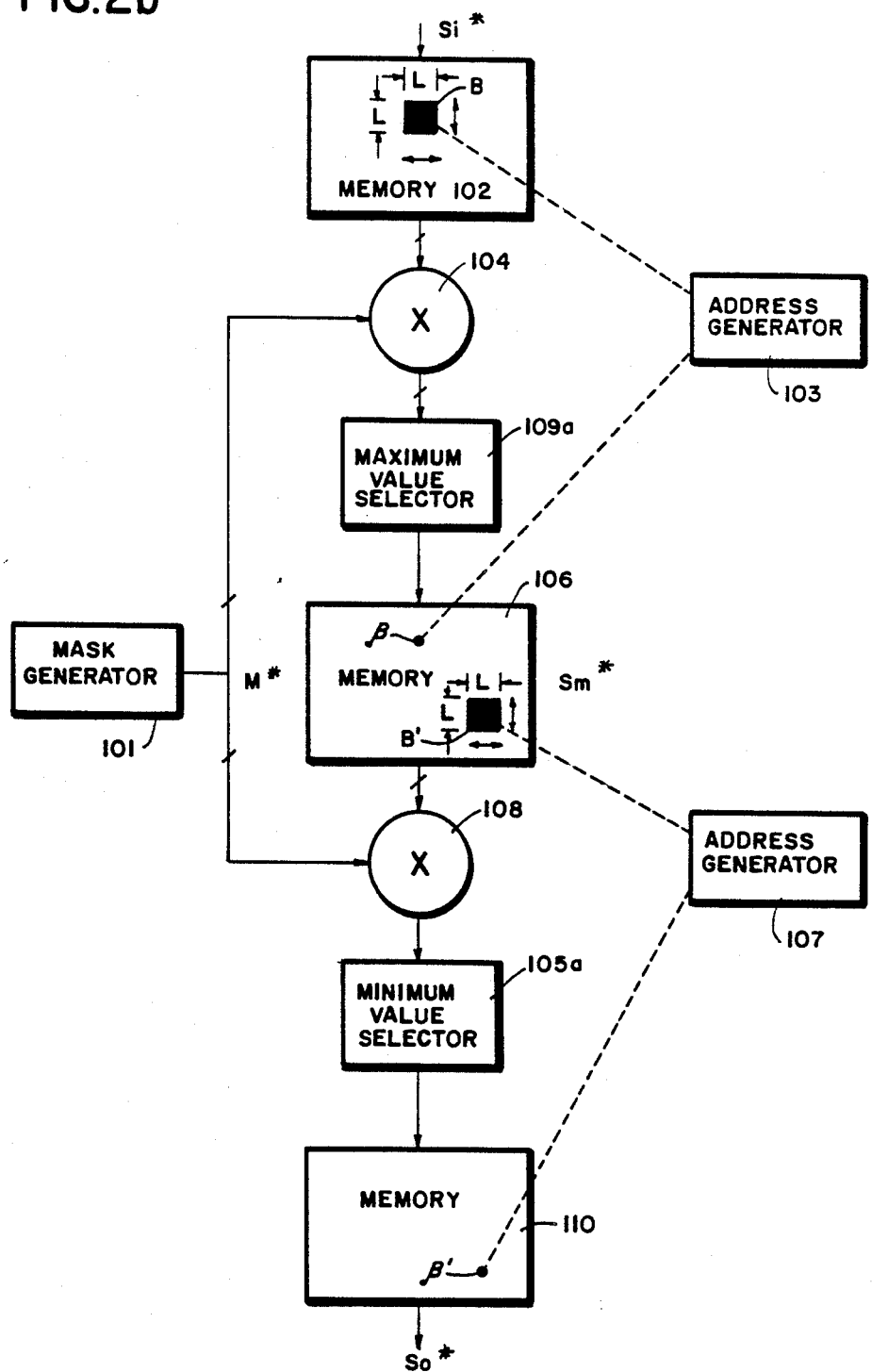
FIG. 2b illustrates a circuit which implements a masked negative monopolar sifting filter.

FIG. 2b illustrates a masked negative monopolar filter circuit which is, in all respects, equivalent to the circuit of FIG. 2a except that a maximum value selector circuit 109a selects the maximum value of the mask-block B product signal samples for storage at a corresponding location B in the second memory 106 while a minimum value selector circuit 105a selects the minimum value of the mask-block B' signal samples for storage at the corresponding B' location in memory 110.

Figure 3B:
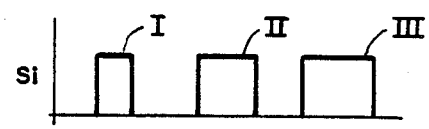
Figure 3C:
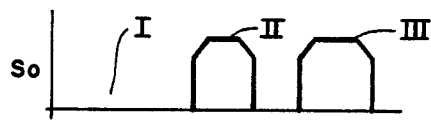

FIGS. 3a through 3c illustrate the operation of a masked positive monopolar sifting filter on a one-dimensional signal. If the mask M of FIG. 3a is shifted over and multiplied by the narrow pulse I of the input signal $S_i$ of FIG. 3b, at least one signal sample value of the resultant product will always be zero and the corresponding output signal $S_o$ (FIG. 3c) will be zero. Thus all positive going details of the signal which are smaller than L-1 will be eliminated. However, larger details of the input signal (for example pulses II and III of FIG. 3b) will be affected by the shape of the mask which, in this case, results in the corners of the pulses being tapered by an amount which is a function of the mask shape.

Masked sifting has an important advantage over conventional sifting of the prior art. Conventional sifting has been used to eliminate impulsive image noise as well as to synthesize long pass, short pass, and bandpass sieves. However, conventional sifting of images often produces an objectionable "blocking noise" pattern which is caused by a sharp cut-off of features which are smaller than the hole size. Mask sifting also removes small "noise" features but tapers the clipping of intermediate size features to soften the blocking noise pattern typical of prior art devices.

Figure 1:
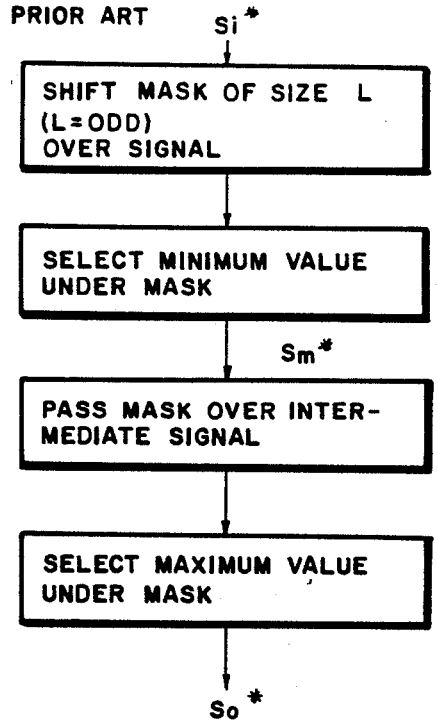
FIG. 1 illustrates a conventional sifting algorithm of the prior art.
Figure 4:
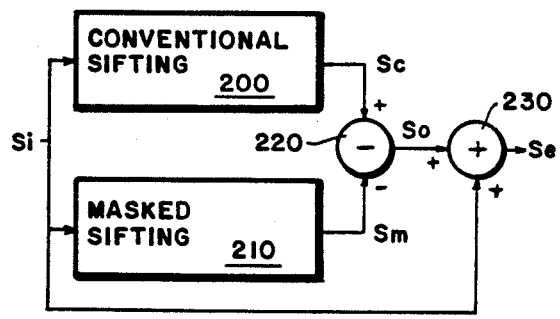
FIG. 4 is an edge enhancing filter circuit.
Figure 5A:
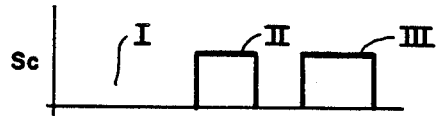
FIG. 5a through 5c illustrate the operation of the circuit of FIG. 4.
Figure 5B:
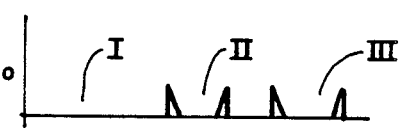
Figure 5C:
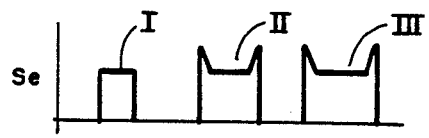

Conventional sifting followed by mask sifting can be used to implement a large variety of edge-enhanced images. FIG. 4 illustrates such a device. An input signal $S_i^*$ is passed, in parallel, through a conventional positive monopolar sifting filter 200 and a masked positive monopolar sifting filter 210. If the conventional sifting filter 200 using a rectangular mask of width L is applied to the input signal $S_i$ of FIG. 3b the output signal $S_c^*$ has the form illustrated in FIG. 5a. Masked sifting of the same signal using the tapered mask M illustrated in FIG. 3a produces an output $S_m^*$ corresponding to the signal of FIG. 3c. The output of the masked sifting filter 210 $S_m^*$ is subtracted from the output of the conventional sifting filter 200 $S_c$ in a subtractor 220 to produce an intermediate output signal $S_o$ (FIG. 5b) which represents edge information of only those signal features which are wider than the mask hole size. The output of subtractor 220 is then added to the input signal $S_i$ in adder 230 to yield an edge-enhanced output signal $S_e$ (FIG. 5c) wherein only those input signal features II and III which are wider than the mask hole size are enhanced.

The shape of the mask profile can be changed to modify the shape of the edge-enhancement characteristic applied by the filter. Thus the concave mask profile of FIG. 6a produces a generally convex edge-enhancement function illustrated in FIG. 6b while the concave mask profile of FIG. 7a produces the generally convex edge-enhancement function of FIG. 7b.

FIG. 8 is a bandpass edge-enhancement filter which edge enhances only those signal features which are close to the mask hole size. The input signal $S_i^*$ is applied to a conventional sifting filter 200 the output of which is connected, in cascade, to the input of a masked sifting filter 210. The output $S_o^*$ of the masked sifting filter 210 is added to the input signal $S_i$ in adding circuit 230 to produce the edge-enhanced output signal $S_e^*$. If the conventional sifting filter uses a mask width L and the mask shifting filter 210 uses a peaked corner mask waveform of the type illustrated in FIG. 9a, the output of the mask sifting filter 210 $S_o^*$ will have the wave shape illustrated in FIG. 9b. The sum of $S_o^*$ with the input signal $S_i^*$ results in the enhanced output waveform $S_e^*$ illustrated in FIG. 9c.

The use of a nonsymmetrical mask function, for example the mask function M illustrated in FIG. 10a, results in nonsymmetrical edge-enhancement, as shown in FIG. 10b. This nonsymmetrical enhancement can be used to apply shadow patterns to an image which are reminiscent of those produced by concentrated light sources.

While the mask sifting filter operations of the present invention have been generally described and illustrated herein with respect to the enhancement of two-dimensional image data, they are equally applicable to noise filtering and peaking of one dimensional signals, for example audio communication or broadcast radio signals.

What is claimed:

1. A non-linear filter which uses a mask signal to perform a masked sifting operation on an input signal to produce an output signal, each of said signals being defined by a series of signal sample values at a plurality of uniformly spaced sample points, comprising:
    means which generate the mask signal, said mask signal having a value of zero except at a predetermined odd number of signal sample points which lie within and define the extent of a mask window and having a plurality of different values at the signal sample points which lie within the mask window;
    means which effect a relative shift between the mask signal and the input signal to successively align a central sample point in the window with each sample point of the input signal;
    means which multiply the mask signal by the input signal at each of the successive alignments to produce a series of corresponding product signals; and
    means which generate a corresponding output signal value for each of said product signals by choosing a value which characterizes the corresponding product signal.

2. A filter as set forth in claim 1 wherein the means which generate the output signal value chooses the minimum value of each product signal as the corresponding output signal value.

3. A filter as set forth in claim 1 wherein the means which generate the output signal value chooses the maximum value of each product signal as the corresponding output signal value.

4. A non-linear filter which uses a mask signal to perform a masked positive monopolar sifting operation on an input signal to produce an output signal, each of said signals being defined by a series of signal sample values at a plurality of uniformity spaced sample points comprising:
    means which generate the mask signal, said mask signal having a value of zero except at a predetermined odd number of signal sample points which lie within and define the extent of a mask window and having a plurality of different values at the signal sample points which lie within the mask window;
    means which first effect a shift of the mask signal with respect to the input signal to successively align a central sample point in the window with each sample point of the input signal;
    means which multiply the mask signal by the input signal at each of the successive alignments to generate a plurality of first product signals;
    means which generate a corresponding intermediate signal value for each alignment by choosing the minimum value of the corresponding first product signal;
    means which then effect a shift of the mask signal with respect to the intermediate signal to successively align the central sample point of the window with each sample point of the intermediate signal;
    means which multiply the mask signal by the intermediate signal at each of the successive alignments to generate a plurality of second product signals and;
    means which generate a corresponding output signal value for each alignment of the mask and intermediate signals by choosing the maximum value of the corresponding second product signal.

5. A non-linear filter which uses a mask signal to perform a masked negative monopolar sifting operation on an input signal to produce an output signal, each of said signals being defined by a series of signal sample values at a plurality of uniformity spaced sample points comprising:
    means which generate the mask signal, said mask signal having a value of zero except at a predetermined odd number of signal sample points which lie within and define the extent of a mask window and having a plurality of different values at the signal sample points which lie within the mask window;
    means which first effect a shift of the mask signal with respect to the input signal to successively align a central sample point in the window with each sample point of the input signal;
    means which multiply the mask signal by the input signal at each of the successive alignments to generate a plurality of first product signals;
    means which generate a corresponding intermediate signal value for each alignment by choosing the maximum value of the corresponding first product signal;
    means which then effect a shift of the mask signal with respect to the intermediate signal to successively align the central sample point of the window with each sample point of the intermediate signal;
    means which multiply the mask signal by the intermediate signal at each of the successive alignments to generate a plurality of second product signals and;
    means which generate a corresponding output signal value for each alignment of the mask and intermediate signals by choosing the minimum value of the corresponding second product signal.

6. The apparatus of any of claims 1 to 5 wherein the mask signal values are symmetrical with respect to the central sample point and increase monotonically from the edges of the window to the sample point.

7. The apparatus of any of claims 1 to 5 wherein the mask signal has a waveform which is flat-topped in the vicinity of the central point and which then slopes downward toward the edges of the mask window.

8. The apparatus of any of claims 1 to 5 wherein the mask signal has a waveform which is flat-topped in the vicinity of the central point and which then slopes upward toward the edges of the mask window.

9. The apparatus of any of claims 1 to 5 wherein the mask signal has a waveform which is flat-topped from one edge of the mask to the central point and which slopes upward from the central point to a second edge of the mask window.

10. A method for using a mask signal to perform a masked sifting operation on an input signal to produce an output signal, each of said signals being defined by a series of signal sample values at a plurality of uniformity spaced sample points, comprising the steps of:
   generating the mask signal, said mask signal having a value of zero except at a predetermined odd number of signal sample points which lie within and define the extent of a mask window and having a plurality of different values at the signal sample points which lie within the mask window;
   shifting the mask signal with respect to the input signal to successively align a central sample point in the window with each sample point of the input signal;
   multiplying the mask signal by the input signal at each of the successive alignments to produce a series of corresponding product signals; and
   generating a corresponding output signal value for each of said product signals by choosing a value which characterizes the corresponding product signal.

11. A method as set forth in claim 10 wherein the step of generating the output signal value comprises choosing the minimum value of each product signal as the corresponding output signal value.

12. A method as set forth in claim 11 wherein the step of generating the output signal value comprises choosing the maximum value of each product signal as the corresponding output signal value.

13. A method for using a mask signal to perform a masked positive monopolar sifting operation on an input signal to produce an output signal, each of said signals being defined by a series of signal sample values at a plurality of uniformity spaced sample points comprising the steps of:
   generating the mask signal, said mask signal having a value of zero except at a predetermined odd number of signal sample points which lie within and define the extent of a mask window and having a plurality of different values at the signal sample points which lie within the mask window;
   first shifting the mask signal with respect to the input signal to successively align a central sample point in the window with each sample point of the input signal;
   multiplying the mask signal by the input signal at each of the successive alignments to generate a plurality of first product signals;
   generating a corresponding intermediate signal value for each alignment by choosing the minimum value of the corresponding first product signal;
   then shifting the mask signal with respect to the intermediate signal to successively align the central sample point of the window with each sample point of the intermediate signal;
   multiplying the mask signal by the intermediate signal at each of the successive alignments to generate a plurality of second product signals; and
   generating a corresponding output signal value for each alignment of the mask and intermediate signals by choosing the maximum value of the corresponding second product signal.

14. A method for using a mask signal to perform a masked negative monopolar sifting operation on an input signal to produce an output signal, each of said signals being defined by a series of signal sample values at a plurality of uniformity spaced sample points comprising the steps of:
   generating the mask signal, said mask signal having a value of zero except at a predetermined odd number of signal sample points which lie within and define the extent of a mask window and having a plurality of different values at the signal sample points which lie within the mask window;
   first shifting the mask signal with respect to the input signal to successively align a central sample point in the window with each sample point of the input signal;
   multiplying the mask signal by the input signal at each of the successive alignments to generate a plurality of first product signals;
   generating a corresponding intermediate signal value for each alignment by choosing the maximum value of the corresponding first product signal;
   then shifting the mask signal with respect to the intermediate signal to successively align the central sample point of the window with each sample point of the intermediate signal;
   multiplying the mask signal by the intermediate signal at each of the successive alignments to generate a plurality of second product signals; and
   generating a corresponding output signal value for each alignment of the mask and intermediate signals by choosing the minimum value of the corresponding second product signal.

15. The method of any of claims 10 to 14 wherein the input, output, and mask signals are two dimensional signals wherein the signal sample points represent image pixels.

16. The method of any of claims 10 to 14 wherein the mask signal values are symmetrical with respect to the central sample point and increase monotonically from the edges of the window to the sample point.

17. The method of any of claims 10 to 14 wherein the mask signal has a waveform which is flat-topped in the vicinity of the central point and which then slopes downward toward the edges of the mask window.

18. The method of any of claims 10 to 14 wherein the mask signal has a waveform which is flat-topped in the vicinity of the central point and which then slopes upward toward the edges of the mask window.

19. The method of any of claims 10 to 14 wherein the mask signal has a waveform which is flat-topped from one edge of the mask to the central point and which slopes upward from the central point to a second edge of the mask window.

20. A method of processing an input image signal comprising the steps of:
   performing a conventional sifting operation on the input signal to produce a first intermediate signal which corresponds to the input signal with small image features removed;
   performing a masked sifting operation on the input signal to produce a second intermediate signal; and
   subtracting the second intermediate signal from the first intermediate signal to produce an output image signal which substantially includes only edge information.

21. A method of processing an input image signal comprising the steps of:
   performing a conventional sifting operation on the input signal to produce a first intermediate signal which corresponds to the input signal with small image features removed;
   performing a masked sifting operation on the first intermediate signal to produce to produce an output image signal which substantially includes only edge information.

* * * * *